April 28, 1931.  R. J. RAVENCROFT  1,802,958
AUTOMOBILE ROAD LIGHTING
Filed Nov. 13, 1929
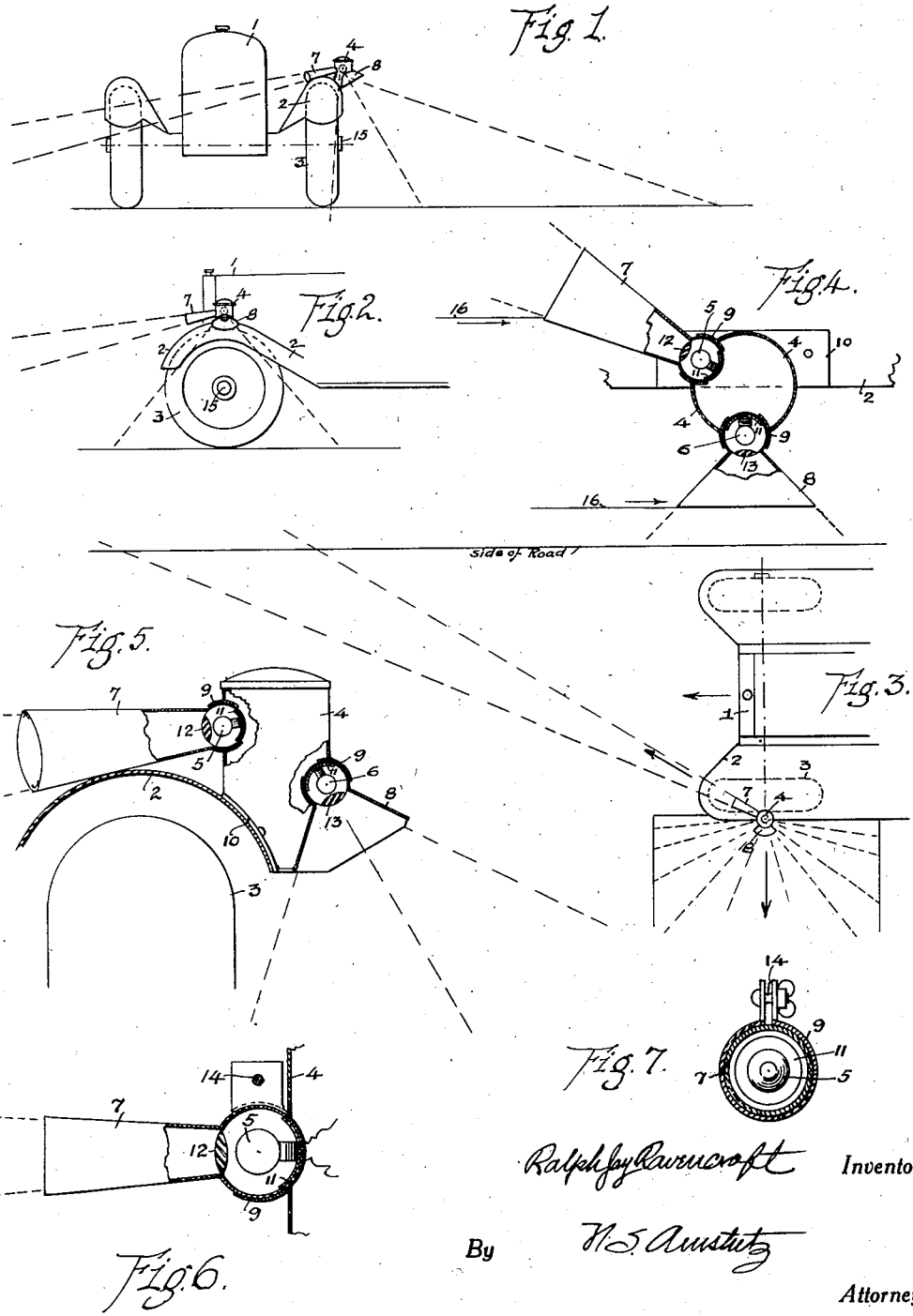
Ralph J. Ravencroft Inventor
By H. S. Amstutz Attorney Patented Apr. 28, 1931

1,802,958

UNITED STATES PATENT OFFICE

RALPH JAY RAVENCROFT, OF ROCHESTER, INDIANA

AUTOMOBILE ROAD LIGHTING

Application filed November 13, 1929. Serial No. 406,960.

My invention relates to improvements in automobile road lighting and it more especially consists of the features pointed out in the annexed claims.

The purpose of my invention is to provide a source of road illumination which has not been used hitherto; that overcomes the hazard of night driving; that avoids all glare to the oncoming driver; that illuminates the principal source of night driving accidents— the front left wheel of a car and the entire roadway alongside; that provides a combined spot light with a glare shielding tube; and that supports the source of illumination in a suitable casing.

With these and other ends in view, I illustrate in the accompanying drawing such instances of adaptation as will disclose the broad underlying features of the invention without limiting myself to the specific details shown thereon and described herein.

Figure 1 is a fragmentary front view of automobile wheels and fenders, of a single source of illumination.

Fig. 2 is a side elevation of Fig. 1.

Fig. 3 is a top plan view of Fig. 1.

Fig. 4 is an enlarged plan view of a plurality of lamps assembled in a single housing.

Fig. 5 is a side elevation of Fig. 4.

Fig. 6 is an elevation in section of a universal joint for attaching an antiglare tube to the housing.

Fig. 7 is a detached elevation of means for clamping the universal joint.

In attaching my safety lamps on an automobile, I may use whatever equivalents and alternatives that the exigencies of variable conditions may demand without departing from the broad spirit of the invention.

The hazard of night driving under existing conditions of illumination is an increasing danger to everyone who uses an automobile after dark. The promised efficacy of dimmers leaves much to be desired. Antiglare lenses etc. etc. have not solved the problem, for the reason that the source of greatest danger—the left front hubs of automobiles remain unilluminated. In addition, the glare of conventional spot lights is not overcome, even though they are attached so as to direct the light toward the right hand edge of the road.

It is an established fact that the majority of accidents during night driving are due to defective illumination. It is immaterial whether the intensity is excessive or insufficient, because under either one of these conditions, or any average of them, the danger has not been removed. With my system of safety illumination, night driving becomes as safe as during daylight. Whoever has driven an automobile after dark has been subjected to the nerve wrecking strain produced by the glare from the lamps of oncoming machines, and the lack of definition or visibility of the front left hubs, wheels, and fenders of approaching automobiles.

I overcome all of these difficulties in a very simple manner by combining in one housing, a single or separate lamp bulbs associated with the usual reflectors, lenses, etc. The light from one of these bulbs, or a single source, streams directly onto and across the highway at the left of the machine, thus I positively eliminate the glare which is inevitably present when the beam of light is substantially parallel to the line of traffic. In my device it is directed across the line of traffic. The light from the other bulb, or a single source, is directed forward and downward at an acute angle to the line of car travel toward the right hand side of the roadway. By reason of the antiglare cone of the spot light no direct rays of its bulb can possibly enter the eye of an oncoming driver.

In the example of adaptation instanced in the accompanying drawing, 1 represents the front end of an automobile provided with the usual fenders. The left hand front one is indicated at 2. The left front wheel corresponding to this fender is shown at 3. Its hub cap 15 is the prime source of trouble when it is accidently engaged by the left front hub cap of an approaching car.

Any desired form of housing, exemplified by 4, may be used. The housing or casing supports a spot lamp and what may be called the collision lamp. The spot lamp comprises an antiglare shield 7, and the collision lamp a cone 8. The cone 8 and the shield 7 at their inner ends may terminate in ball and socket joints 9. When separate bulbs are used, each one may be provided with a reflector 11. The lamp 5 may have a lens 12 in front of it, and the lamp 6 may have a lens 13 associated with it. The housing or casing 4 is fastened at 10 in any desired manner onto the fender 2. The ball and socket joints may be used if desired, and when used a clamp 14 will serve to fixedly hold the parts in different adjustments. If desired, the cone 8 or the tubular shield 7 may be secured to the casing 4 in whatever permanent relation is found to be the most desirable.

On Fig. 4 the line of sight of the oncoming driver is indicated by dotted line 16. These clearly show that it is absolutely impossible for any direct rays of either a single lamp or one of the lamps 5 or 6 to reach the driver of the oncoming car. By reason of this outstanding advantage, there is no longer any necessity for placing exclusive dependence upon special lenses, dimmers, etc.

When a single source of illumination for both purposes is used, the respective lenses may be a part of the cone 8 and the tube 7, and if the parts 7 and 8 are to be adjustable, the ball and socket construction may be retained.

By reason of the simplicity and the efficacy of my lighting system, it is claimed in its broadest aspects.

What I claim is:

1. A hollow casing supporting a source of light, and separate tubular projections from the casing positioned at an angle in respect of each other and independently adjustable whereby the rays of light are simultaneously confined to two separate directions.

2. A hollow casing supporting a source of light, means for supporting the same adjacent the front left portion of an automobile, and ball and socket extensions associated with the casing for directing the light in a restricted beam across the line of travel and simultaneously at an acute angle to the line of travel.

3. A hollow casing having a socket formed in its wall, a hollow ball positioned in the socket, a source of illumination within the ball, means for attaching the casing near the front left portion of an automobile, and a tubular extension of the ball projecting downward and to the right of travel of the automobile.

4. A hollow casing, a socket formed in the casing wall, a tubular extension having a hollow ball at one end positioned in the socket, a source of light within the ball, and means for attaching the casing near the front end of an automobile, said extension projecting forward to obstruct any side rays of the light and directed downward and at an acute angle to the right of a line of travel.

5. A hollow casing, a tubular extension of the casing, a ball and socket connection between the extension and the casing, a source of light within the ball and socket, and means for holding the extension in a desired fixed relation to the casing.

6. A hollow casing, a tubular extension from the casing, a ball and socket between the casing and the extension, and a source of light and a reflector positioned within the ball and socket.

7. A hollow casing, a tubular extension from the casing, a ball and socket between the casing and the extension, and a source of light and a reflector and a lens positioned within the ball and socket.

8. A hollow casing, a tubular extension from the casing, a source of light within the casing oriented with the extension, a universal joint between the casing and the extension, and means for clamping the joint.

9. A suitable support attached to the left front fender of an automobile, a plurality of sockets formed on the support, a plurality of tubular extensions having hollow balls formed at one end which balls are positioned in their respective sockets, a source of light in each ball, and means for independently clamping the extensions to direct the rays from the sources of light in different directions.

In testimony whereof I affix my signature.

RALPH JAY RAVENCROFT.